(12) United States Patent
Hollis

(10) Patent No.: US 10,420,321 B2
(45) Date of Patent: Sep. 24, 2019

(54) ANIMAL FOOD CADDY

(71) Applicant: Patricia Hollis, Kalamazoo, MI (US)

(72) Inventor: Patricia Hollis, Kalamazoo, MI (US)

( * ) Notice: Subject to any disclaimer, the term of this patent is extended or adjusted under 35 U.S.C. 154(b) by 388 days.

(21) Appl. No.: 15/051,914

(22) Filed: Feb. 24, 2016

(65) Prior Publication Data

US 2017/0118951 A1    May 4, 2017

Related U.S. Application Data

(60) Provisional application No. 62/248,519, filed on Oct. 31, 2015.

(51) Int. Cl.
*A01K 5/01* (2006.01)

(52) U.S. Cl.
CPC .......... *A01K 5/0107* (2013.01); *A01K 5/0114* (2013.01)

(58) Field of Classification Search
CPC .. A01K 5/0114; A01K 5/0128; A01K 5/0225; A01K 5/0107; A01K 5/01; A01K 7/005; B65D 51/24; B65D 51/242; B65D 39/16; B65D 45/16; B65D 43/22
USPC ...... 119/51.01, 52.1, 61.5, 61.56; 220/212.5, 220/212, 315, 318, 324
See application file for complete search history.

(56) References Cited

U.S. PATENT DOCUMENTS

| | | | | |
|---|---|---|---|---|
| 2,167,261 A | * | 7/1939 | Sadtler | A24F 19/005 131/231 |
| 2,786,595 A | * | 3/1957 | Nelson | A24F 19/00 131/231 |
| 3,580,260 A | * | 5/1971 | Moore | A24F 19/0078 131/235.1 |
| 5,009,310 A | | 4/1991 | Finney | |
| 5,159,941 A | * | 11/1992 | Tornatore | A24F 19/00 131/236 |
| 5,596,946 A | * | 1/1997 | Bryant | A01K 5/0225 119/52.1 |
| 5,752,464 A | | 5/1998 | King et al. | |
| 5,823,136 A | | 10/1998 | Zarski | |
| D659,913 S | | 5/2012 | Spectre et al. | |
| 8,646,413 B2 | | 2/2014 | Padia | |
| 9,717,215 B2 | * | 8/2017 | Hsu | A01K 5/0114 |
| 2005/0109355 A1 | * | 5/2005 | Goldberg | A24F 19/105 131/231 |
| 2008/0035067 A1 | * | 2/2008 | Ogden | A01K 5/0128 119/61.5 |
| 2010/0275852 A1 | | 11/2010 | Lipscomb et al. | |

* cited by examiner

*Primary Examiner* — David J Parsley
*Assistant Examiner* — Danielle A Clerkley
(74) *Attorney, Agent, or Firm* — WSU Patent Procurement Clinic

(57) ABSTRACT

An animal food caddy that stores animal-related items and is designed to improve animal posture and comfort. The animal food caddy has an upper and lower section which have dual functionality depending on the use. The first application of the animal food caddy is as a portable container that stores animal-related contents such as food, snacks or toys. The second application of the animal food caddy is as a feeding apparatus that generally functions as a non-skid placeholder to stabilize the upper section while the animal is feeding. The inner concave surface of the upper section has a low coefficient of friction designed so that food gravitationally funnels toward the nadir of the bowl. The animal food caddy conveniently provides the owner a means of efficiently transporting animal-related items while substantially improving animal posture and comfort during times of travel.

17 Claims, 4 Drawing Sheets

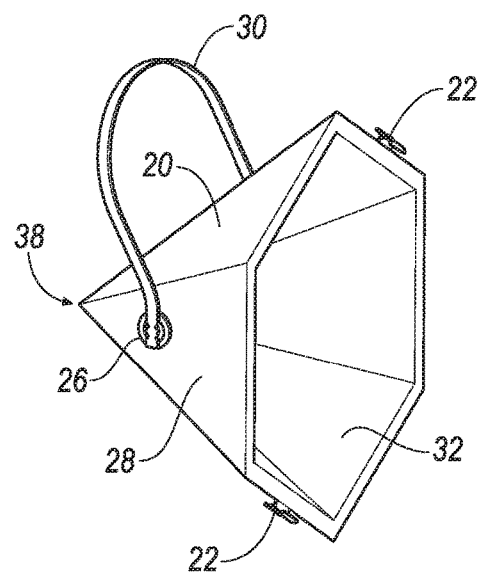
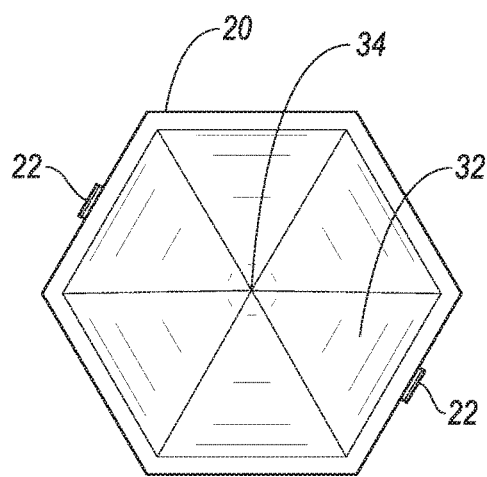
FIG. 4
FIG. 5
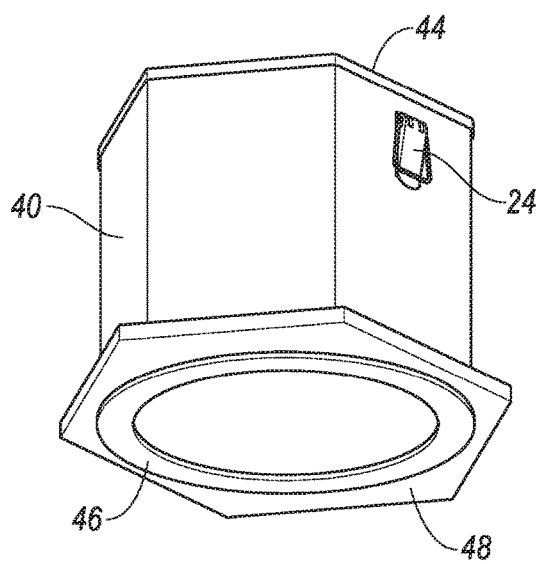
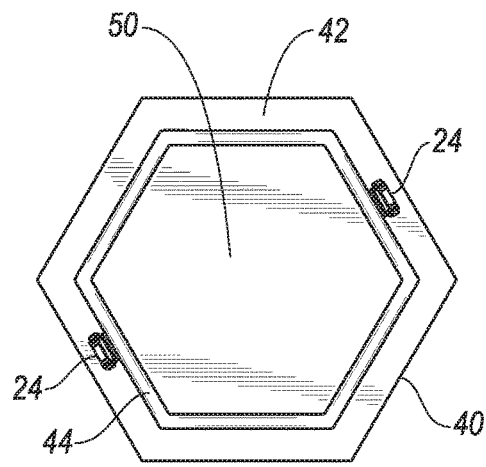
FIG. 6
FIG. 7

ANIMAL FOOD CADDY

FIELD OF INVENTION

This application claims the benefit of U.S. Provisional Application No. 62/248,519 filed on Oct. 30, 2015. The present invention relates to an animal food container, and more specifically to a portable container with an animal food dish advantageously designed to reduce animal discomfort while traveling.

BACKGROUND

Animals possess many physiological attributes that give them their astounding sensory abilities. A prominent feature of these sensory abilities include vibrissae or long stiff hairs, commonly known as whiskers which are chiefly on the muzzle of most mammals and function as tactile organs. Whiskers are connected securely to the animal's sensitive muscular and nervous systems, sending information about the surrounding environment directly to the animal's sensory nerves. This gives the animal a heightened sense of feeling and thereby helps the animal adapt to changes in its environment.

The tips of whiskers have sensory organs called proprioceptors which are very sensitive to pressure. Proprioceptors help an animal detect the presence, size, and shape of nearby objects the animal may not be able to see. Furthermore, proprioceptors make whiskers exquisitely sensitive. Poorly designed food or water bowls may result in irritation to the the animal if the animals whiskers touch the sides of the bowl.

Bowls that have relatively deep and narrow sides are particularly ill-suited for animals, such as cats, equipped with elongated tactile hairs. In fact, cats have four horizontal rows of whiskers that extend outwardly to each side from the vicinity of the mouth and nose. The longest of a cat's whiskers may extend as far as the width of the cat's body. If a cat inserts its head partway into a poorly designed bowl, the cat may brush its whiskers against the sides. As a result, the repetitive motion of whiskers against the side of the bowl during feeding may inflame the nerves in the whisker causing irritation.

Animals with particularly sensitive whiskers that have become irritated have been known to stop eating their food altogether due to whisker sensitivity. Consequently, the animals have been known to eat their food only from the center of the bowl thereby avoiding their food located around the perimeter of the bowl. Since an animal's owner typically places a predefined amount of food in a bowl, an animal's unwillingness to eat food around the perimeter of the bowl due to whisker sensitivity may result in the animal not being sufficiently fed possibly resulting in malnourishment. As a result, the malnourished animal often becomes a nuisance to its owner.

In addition, servicing the nourishment needs of an animal during times of travel is substantially more challenging. Although feeding services for animals intended for use in the home are widely available these services do not incorporate many of the aforementioned features designed to improve animal posture and overall comfort while feeding. Portable feeding services do not use bowls designed to minimize whisker sensitivity while providing maximum food storage. As a result, overall animal discomfort is increased during times of travel.

As a result, a need exists for an animal food container that maximizes the amount of food storage during periods of travel while minimizing animal discomfort and overall anxiety when feeding.

SUMMARY OF INVENTION

In one aspect of the invention, an animal food caddy is disclosed comprising a lower section having at least one side defining a base perimeter about a hollow cavity. The invention has an upper section which has a concave inner surface and a convex outer surface. The inner concave surface has a low coefficient of friction that allows any contents placed on the inner concave surface to funnel along the inner concave surface towards its nadir. The inner concave surface is constructed of a unitary piece of material such as plastic, metal, stainless steel or ceramic. In various embodiments the inner concave surface is non-porous to permit liquids to be held in the volume defined by the inner concave surface. A handle is attached near the apex of the outer convex surface that has a dimension less than the outer convex surface. The outer convex surface of the upper section engages the base perimeter of the lower section when the nadir is within the hollow cavity, thereby forming an animal food dish. The inner concave surface of the upper section engages the base perimeter of the lower section when the nadir is outside the hollow cavity, thereby forming an animal food container with the upper section serving as a lid.

The lower section of the animal food caddy can have a plurality of generally planar sides which may correspond with generally planar sides of the upper section. The length of the base perimeter of the lower section is less than the circumferential edge of the inner concave surface of the upper section. The upper section may have an outer diameter between 4 and 8 inches and the inner concave surface may have a depth between 2 and 6 inches. The base of the lower section may have a high coefficient of friction surface attached to the bottom.

The animal food caddy has at least one fastener fixed to the lower section wherein the fastener connects to a hook fixed attached to the upper section. The fastener connects to the hook when the outer convex surface of the upper section engages the base perimeter and the nadir is within the hollow cavity, thereby forming an animal food dish. Similarly, the fastener also connects to the hook when the inner concave surface of the upper section engages the base perimeter and the nadir of the nadir is outside the hollow cavity, thereby forming an animal food container.

In another aspect of the invention, an animal food dish is disclosed comprising an upper section having a plurality of generally planar sides which correspond with generally planar sides of the lower section. The length of the base perimeter of the lower section is less than the circumferential edge of the inner concave surface of the upper section. In addition, the upper section may have an outer diameter of 4 to 8 inches and the inner concave surface may have a depth of 2 to 6 inches. The base of the lower section may have a high coefficient of friction surface attached to the bottom. The embodiment has at least one fastener fixed to the lower section wherein the fastener connects to a hook fixed attached to the upper section.

BRIEF DESCRIPTION OF THE DRAWINGS

The embodiments set forth in the drawings are illustrative and exemplary in nature and are not intended to limit the subject matter defined by the claims. The following illustrative embodiments can be better understood when read in conjunction with the following detailed description where the structures are indicated with like reference numerals.

FIG. 4 is a side view of the upper section of the animal food caddy with a handle attached near the apex of the outer convex surface.

FIG. 5 is a top view of the inner concave surface of the upper section of the animal food caddy.

FIG. 6 is a side view of the lower section of the animal food caddy with a non-skid attached to the lower section.

FIG. 7 is a top view of the lower section illustrating the hollow cavity of the animal food caddy.

DETAILED DESCRIPTION

The illustrated embodiment is disclosed with reference to drawings. However, it is to be understood that the disclosed embodiment is intended to be merely an example that may be embodied in various and alternative forms. The figures are not necessarily to scale and some features may be exaggerated or minimized to show detail of particular components. The specific structural and functional details disclosed are not to be interpreted as limiting, but as a representative basis for teaching a person of ordinary skill in the art how to practice the disclosed concepts.

Figure 1:
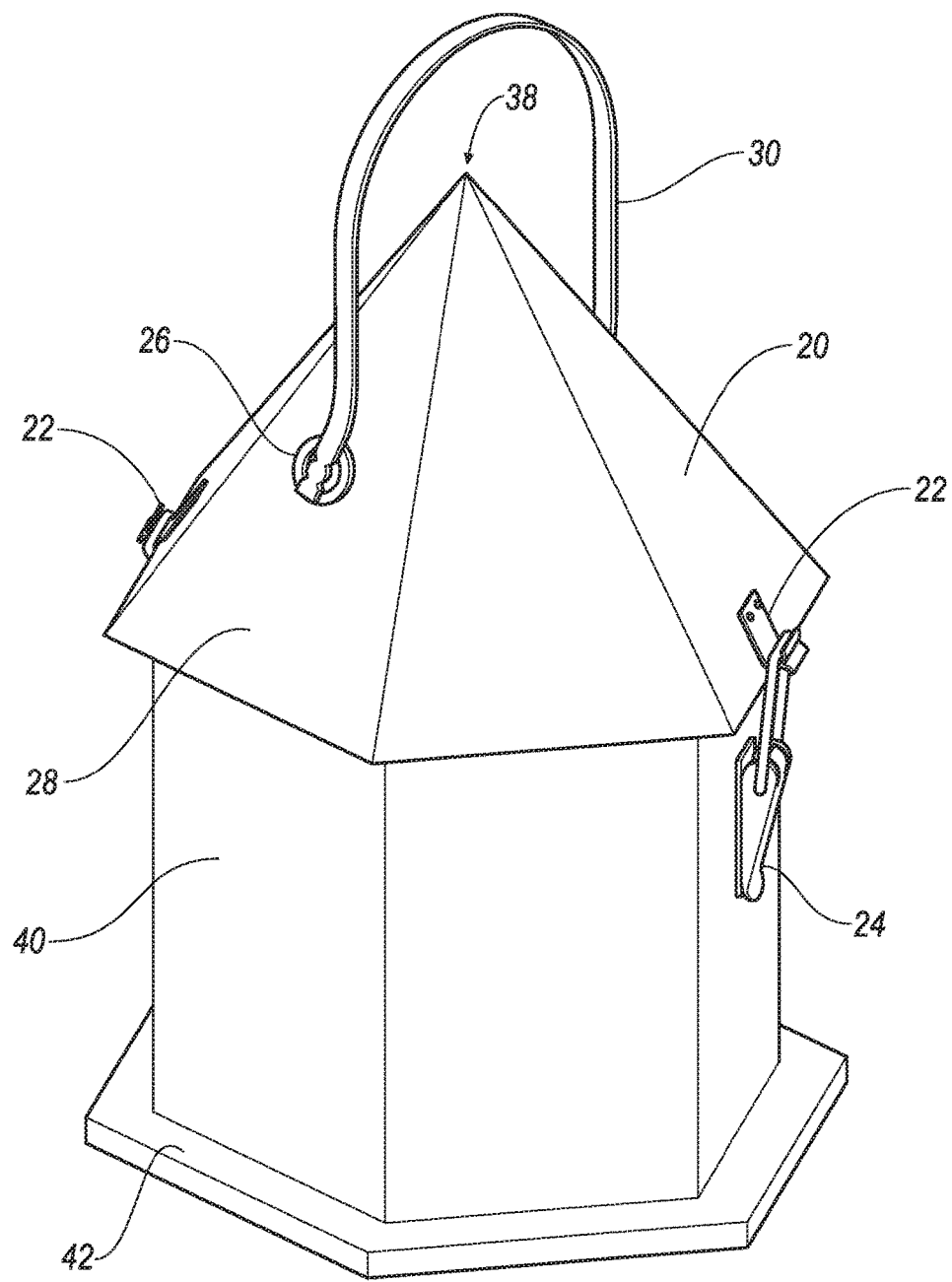
FIG. 1 is a perspective view of the animal food caddy, wherein the animal food caddy functions as a portable container in the embodiment.

FIG. 1 is a perspective view of an animal food caddy, wherein the animal food caddy functions as a portable container in the embodiment. The embodiment consists of two parts, an upper section 20 and a lower section 40 which may be interconnected by means of a fastener 24. The upper section 20 has a dual purpose as both a lid to the lower section 40 when the embodiment is used as a portable container. Additionally, the upper section 20 functions as an animal feeding apparatus when rotationally inverted and placed in the lower section 40. Similarly, the lower section has a dual purpose as both a container and a stable placeholder for the upper section 20. In the embodiment, the upper section 20 and lower section 40 are symmetrical and may include, but are not limited to, six corresponding planar sides. The perimeter of the upper section 20 is equal to or greater than the perimeter of the lower section 40.

At least one fastener 24 may be used to connect the upper section 20 to the lower section 40. In the embodiment, a second fastener 28 may be used opposite the first fastener 24. The use of a plurality of fasteners ensures that the upper section 20 is securely attached to the lower section 40. The fastener 24 may be fixed to at least one of the planar sides of the lower section 40 and latches to a hook 22 permanently secured to at least one of the planar sides of the upper section 20. The fastener 24 is a buckle fastener, living hinge, clasp or other known fastener. The fastener 24 can have a spring loaded release allowing the user to selectively release the fastener 24 connection from the hook 22 thereby disconnecting the upper section 20 from the lower section 40. In the embodiment, the upper section 20 functions as a lid to the lower section 40 which functions as a container. The hook 22 may be selected to have the capability of securing the upper section 20 to the lower section 40 when the upper section 20 is used as both a lid and a bowl. The hook 22 is manufactured from, but not limited to, a rigid material such as steel, aluminum or plastic.

The embodiment in FIG. 1 also contains a handle 30 attached near the apex 38 of the outer convex surface 28 of the upper section 20. The handle 30 may be used to hold the animal food caddy during travel. The handle 30 attaches to a fixed position 26 on at least one of the planar sides of the upper section 20. The fixed position 26 may be partially disposed on at least one of the planar sides of the upper section 20 and used to connect to the handle 30 to the upper section 20. The fixed position 26 and the handle 30 may be either disconnected or attached depending on the preferences of the user. The fixed position 26 may be connected to the planar side of the upper section 20 by mounting methods known to a person of ordinary skill in the art. The handle 30 may be manufactured from either a rigid or flexible structure depending on preferences. Furthermore, the height of the handle 30 may be adjustable or fixed. The length of the handle 30 may not exceed the inner diameter of the lower section 40 to ensure the handle 30 fits within the hollow cavity 50 of the lower section 40.

The embodiment of FIG. 1 has a base 42 which is connected to the lower section 40. The base 42 has an outer perimeter at least the length of the outer perimeter of the lower section 40. The base 42 is perpendicularly attached so that the lower section 40 extends vertically from the base 42. If desired, the base 42 is manufactured from a heavier material than the lower section 40 to increase stability of the apparatus. FIG. 1 illustrates the embodiment of the invention used as an animal food container for transporting animal food as well as other contents related to the animal.

Figure 2:
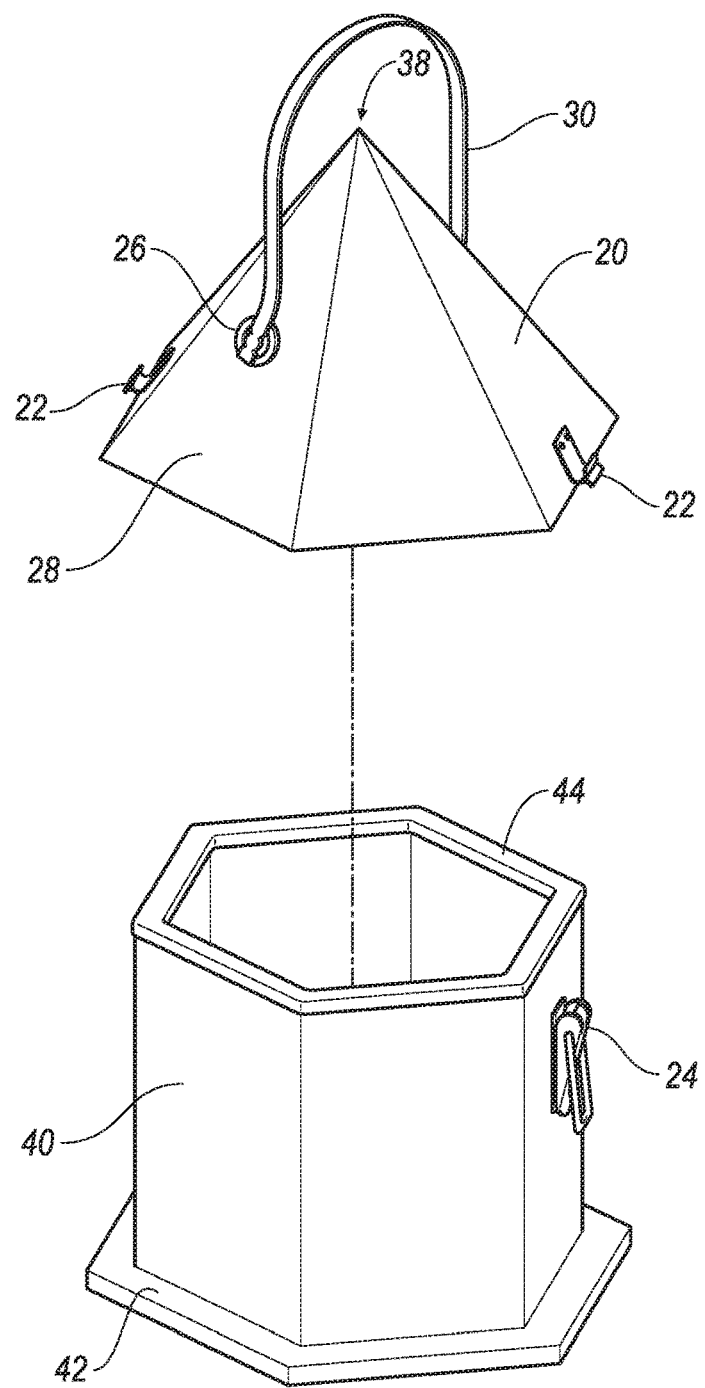
FIG. 2 is a perspective view of the animal food caddy, wherein the embodiment illustrates the upper section of the carrying container vertically detached from the lower section.

FIG. 2 is a perspective view of the animal food caddy, wherein the embodiment illustrates the upper section 20 of the carrying container vertically detached from the lower section 40. In the embodiment, the upper section 20 is vertically raised away from the lower section 40. The vertically raised upper section 20 is then rotationally inverted and lowered towards the lower section 40 so that the nadir 34, illustrated in FIG. 5, of the upper section 20 is placed in the hollow cavity 50 of the lower section 40. In the embodiment, the generally planar sides of the upper section 20 align with the corresponding generally planar sides of the lower section 40. In addition, the lower section 20 may have a base perimeter rim 44 around the upper perimeter of the lower section 20, opposite from the base 42. The base perimeter rim 44 creates a high coefficient of friction surface between the upper section 20 and lower section 40. In various embodiments, the coefficient of friction of the base perimeter 44 is between 0.40 and 0.99, preferably between about 0.60 and 0.95, optimally between about 0.80 and 0.90. Together using the base perimeter rim 44 and fastener 24 substantially reduce the likelihood of contents escaping from the lower section 40. Additionally, the alignment between the generally planar sides of the upper section 20 and lower section 40 along the perimeter of the base perimeter rim 44 ensures a stable feeding platform for the apparatus.

Figure 3:
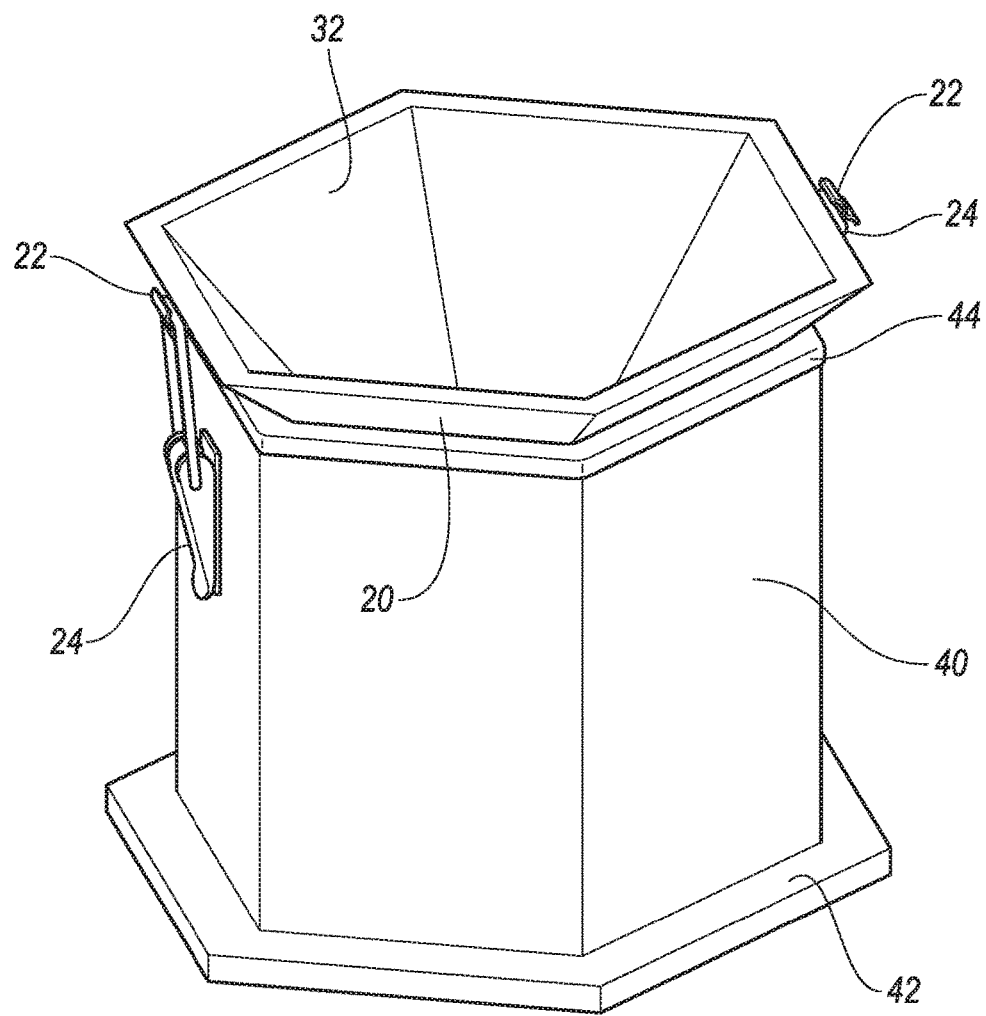
FIG. 3 is a perspective view of the animal food caddy functioning as a feeding apparatus, wherein the embodiment illustrates the upper section rotationally inverted and set in the lower section.

FIG. 3 is a perspective view of the animal food caddy as a feeding apparatus, wherein the upper section 20 is rotationally inverted and placed in the lower section 40. The lower section 40 functions as a placeholder for the inverted upper section 20. The base perimeter rim 44 minimizes slippage between the upper section 20 and the lower section 40 when an animal is feeding from the apparatus. In addition, a fastener 24 may be connected to a hook 22 to further improve stabilization. When inverted, the upper section 20 functions as a bowl. The inner concave surface 32 of the upper section 20 is manufactured from a material with a low coefficient of friction, thereby allowing food to gravitationally funnel from the perimeter of the inner concave surface 32 towards the center, or nadir 34. The coefficient of friction of the inner concave surface 32 is between 0.01 and 0.60, preferably between about 0.02 and 0.30, optimally between about 0.04 and 0.10. The height of the lower section 40 is such that it minimizes instability when the animal is feeding from the apparatus. The inner concave surface 32 of the upper section 20 is advantageously constructed and arranged with a shallow depth that allows an animal to eat food from the upper section 20 while minimizing the animal's whiskers from contacting the inner concave surface 32 of the upper section 20.

FIG. 4 is a side perspective view of the upper section 20 of the animal food caddy with a handle 30 attached near the apex 38 of the outer convex surface 28. FIG. 5 is a top view perspective of the animal food caddy when the upper section 20 is rotationally inverted to serve as a bowl. It illustrates the inner concave surface 32 of the upper section 20 of the animal food caddy. The inner concave surface 32 is manufactured from a material with a low coefficient of friction to ensure the contents within the inner concave surface 32 gravitationally funnel from the perimeter towards the nadir 34. The coefficient of friction of the inner concave surface 32 is between 0.01 and 0.60, preferably between about 0.02 and 0.30, optimally between about 0.04 and 0.10. In various embodiments, the inner concave surface 32 is constructed of, but is not limited to, a unitary piece of material such as plastic, stainless steel or ceramic. The inner concave surface 32 is either a conical geometry or a plurality of generally planar sides. In various embodiment, the dimensions of the upper section 20 may be, but is not limited to, a bowl with a outer diameter between 4.0 and 8.0 inches, preferably between 5.0 and 7.0 inches, optimally between 5.5 and 6.5 inches. In various embodiments, the depth of the inner concave surface 32 of the upper section 20 is between 2.0 and 6.0 inches, preferably between 3.0 and 5.0 inches, optimally between 3.5 and 4.5 inches.

FIG. 5 illustrates the lowest point, or nadir 34, of the upper section 20. The nadir 34 is the location in the inner concave surface 32 in which the contents of the upper section 20 will gravitationally funnel when used as a bowl. The inner concave surface 32 may intersect the outer annular lip, or circumferential edge, extending upwardly from the nadir 34 to the uppermost margin. In the embodiment, the inner concave surface 32 may be constructed of hexagonal generally planar sides. The inner concave surface 32 has a shallow depth to minimize animal whisker contact with the inner concave surface 32. The depth of the inner concave surface 32 of the upper section 20 is between 2.0 and 6.0 inches, preferably between 3.0 and 5.0 inches, optimally between 3.5 and 4.5 inches. The inner concave surface 32 may be structurally nonporous to allow the upper section 20 to hold liquids without leaking. The inner concave surface 32 is a generally spherical section having a relatively large radius of curvature compared to conventional animal food dishes thereby helping to impart the desirably advantageous shallow depth that minimizes whisker contact in the upper section 20. The inner concave surface 32 is particularly well suited for use with domestic cats. The lower section 40 is designed to be generally wide and low to the ground, producing a stable feeding dish that improves animal posture when feeding. Due to the low and wide design, the upper section 20 and lower section 40 is able to fit conveniently in a standard dishwasher, and is preferably constructed of a dishwasher-safe material.

The lower section 40 is particularly well suited for use with domestic cats and may hold, but is not limited to, semi-moist cat food, canned cat food, or wet pouched cat food. There is a tendency for cats to overeat therefore the benefit of the animal food caddy is that the measured portion of the food is continually available to the cat. As a result the owner knows when the cat has eaten its approved portion of food. By providing a dish that gravitationally funnels food from the perimeter of the inner concave surface 32 to the nadir 34, the tendency of cats to overeat is substantially reduced by limiting the amount of food placed in the dish. In another embodiment, such a dish may be configured for use with dogs with the dish having a larger inner concave surface 32 and located even higher off the floor than the above-defined dish that is configured to hold less food.

FIG. 6 is a side view of the lower section 40 of the animal food caddy with a non-skid surface 46 attached to the lower section 40. The non-skid surface 46 is attached to the bottom surface 48 of the lower section 40. The non-skid surface 46 prevents the upper section 20 and lower section 40 from moving while an animal is feeding from the apparatus. In the embodiment, the non-skid surface 46 is made from a material with a high coefficient of friction, such as, but not limited to, rubber, adhesive tape or others familiar to a person having ordinary skill in the art. The coefficient of friction of the non-skid surface 46 is between 0.40 and 0.99, preferably between about 0.60 and 0.95, optimally between about 0.80 and 0.90.

FIG. 7 is a top view of the lower section 40 of the animal food caddy. The embodiment illustrates a hollow cavity 50 within the boundaries of the lower section 40 and the base 42. The hollow cavity 50 may contain, but is not limited to, food, toys and snacks.

It should be understood that, although the foregoing description and drawings describe and illustrate in detail embodiments of the present invention, to those skilled in the art to which the present invention relates, the present disclosure will suggest many modifications and constructions as well as widely differing embodiments and applications without departing from the spirit and scope of the invention.

While exemplary embodiment is described above, it is not intended that the embodiment describe all possible forms of the disclosed apparatus and method. Rather, the words used in the specification are words of description rather than limitation, and it is understood that various changes may be made without departing from the spirit and scope of the disclosure as claimed. The features of various implementing embodiment may be combined to form further embodiments of the disclosed concepts.

What is claimed is:

1. An animal food caddy, comprising:
a lower section having at least one side defining a base perimeter rim about a hollow cavity;
a fastener fixed to said lower section;
an upper section having a concave inner surface and a convex outer surface, said concave inner surface defined between a circumferential edge and a nadir, said concave inner surface having a low coefficient of friction therefore allowing food to gravitationally direct from said circumferential edge of said concave inner surface of said upper section towards said nadir of said concave inner surface said concave inner surface forming a closed end at said nadir;

a hook fixed to said convex outer surface of said upper section;

a handle attached near an apex of said convex outer surface, said handle having a length less than an outer diameter of said circumferential edge;

wherein said convex outer surface of said upper section engages with said base perimeter rim of said lower section when said nadir is within said hollow cavity, and wherein said concave inner surface of said upper section engages said base perimeter rim of said lower section when said nadir is outside said hollow cavity; and wherein said fastener is engagable with said hook when said upper section is engaged with said lower section such that said nadir is within said hollow cavity and when said upper section is engaged with said lower section such that said nadir is outside said hollow cavity.

2. The animal food caddy as in claim 1:

wherein said lower section having a plurality of generally planar sides which engage said convex outer surface of said upper section having corresponding generally planar sides forming an animal food container; and wherein said lower section having a plurality of generally planar sides which engage said concave inner surface of said upper section having corresponding generally planar sides forming an animal food dish.

3. The animal food caddy as in claim 2:

wherein the length of said base perimeter rim is less than said circumferential edge.

4. The animal food caddy as in claim 1:

wherein said inner concave surface of said upper section having an outer diameter between 4 and 8 inches, said inner concave surface of said upper section having a depth between 2 and 6 inches.

5. The animal food caddy as in claim 1, wherein said lower section further comprises:

a base with a bottom wherein the bottom has a high coefficient of friction surface.

6. The animal food caddy as in claim 1, further comprising:

a high coefficient of friction surface attached along said base perimeter rim of said lower section.

7. The animal food caddy as in claim 1:

wherein said concave inner surface is constructed of a unitary, nonporous piece of material.

8. The animal food caddy as in claim 1, wherein said concave inner surface of said upper section extends beyond said base perimeter rim of said lower section when said upper section is engaged with said lower section such that said nadir is within said hollow cavity.

9. The animal food caddy as in claim 1, wherein said convex outer surface of said upper section extends beyond said base perimeter rim of said lower section when said upper section is engaged with said lower section such that said nadir is outside said hollow cavity.

10. An animal food dish, comprising:

a lower section;

a fastener fixed to said lower section;

an upper section having a concave inner surface and a convex outer surface, said concave inner surface defined between a circumferential edge and a nadir, said concave inner surface constructed of a unitary piece of material allowing food to gravitationally direct along said circumferential edge of said concave inner surface of said upper section towards said nadir of said upper section, said concave surface forming a closed end at said nadir;

a hook fixed to said convex outer surface of said upper section;

a handle attached near an apex of said convex outer surface, said handle having a length less than an outer diameter of said circumferential edge;

wherein said upper section has a plurality of generally planar sides which engage a base perimeter rim of said lower section having corresponding generally planar sides; and wherein said fastener is engagable with said hook when said generally planar sides engage said base perimeter rim such that said convex outer surface faces said lower section and when said generally planar sides engage said base perimeter rim such that concave inner surface faces said lower section.

11. The animal food dish as in claim 10, further comprising:

said lower section having at least one side defining said base perimeter rim about a hollow cavity;

wherein said convex outer surface of said upper section engages said base perimeter rim of said lower section when said nadir is within said hollow cavity.

12. The animal food dish as in claim 11:

wherein said concave inner surface of said upper section engages said base perimeter rim of said lower section when said nadir is outside said hollow cavity forming an animal food container.

13. The animal food dish as in claim 10:

wherein said inner concave surface of said upper section having an outer diameter between 4 and 8 inches, said inner concave surface of said upper section having a depth between 2 and 6 inches.

14. The animal food dish as in claim 11 wherein said lower section further comprises:

a base with a bottom wherein the bottom has a high coefficient of friction surface.

15. The animal food dish as in claim 11:

a high coefficient of friction surface along said base perimeter rim of said lower section.

16. The animal food caddy as in claim 10, wherein said concave inner surface of said upper section extends beyond said base perimeter rim of said lower section when said generally planar sides engage said base perimeter rim such that said convex outer surface faces said lower section.

17. The animal food caddy as in claim 10, wherein said convex outer surface of said upper section extends beyond said base perimeter rim of said lower section when said generally planar sides engage said base perimeter rim such that concave inner surface faces said lower section.

* * * * *